(12) United States Patent
Fukuda

(10) Patent No.: US 6,400,842 B2
(45) Date of Patent: *Jun. 4, 2002

(54) IMAGE PROCESSING APPARATUS AND IMAGE PROCESSING METHOD

(75) Inventor: Nobuhiro Fukuda, Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,460

(22) Filed: Dec. 24, 1998

(30) Foreign Application Priority Data

Jan. 14, 1998 (JP) ............................ 10-005304

(51) Int. Cl.[7] ................................ G06K 9/00
(52) U.S. Cl. ....................... 382/162; 382/164
(58) Field of Search .................. 382/162, 163, 382/164, 165, 166, 167, 168, 169, 170, 171, 172, 154, 285; 395/122, 121, 128, 123, 130, 142, 119, 120, 124; 356/12; 345/418, 419, 420, 423, 424, 430, 442

(56) References Cited

U.S. PATENT DOCUMENTS

| | | | | |
|---|---|---|---|---|
| 5,537,520 A | * | 7/1996 | Doi et al. ................ | 395/122 |
| 5,613,050 A | * | 3/1997 | Hochmuth et al. ......... | 395/122 |
| 5,666,474 A | * | 9/1997 | Otto .......................... | 345/421 |
| 5,684,936 A | * | 11/1997 | Otto .......................... | 395/121 |
| 5,872,570 A | * | 2/1999 | Otto .......................... | 345/421 |
| 5,877,769 A | * | 3/1999 | Shinohara ................ | 345/425 |
| 5,886,703 A | * | 3/1999 | Mauldin .................... | 345/423 |
| 5,905,500 A | * | 5/1999 | Kamen et al. ............. | 345/419 |
| 6,243,488 B1 | * | 6/2001 | Penna ........................ | 382/154 |

* cited by examiner

Primary Examiner—Phuoc Tran
Assistant Examiner—Amir Alavi
(74) Attorney, Agent, or Firm—Dickstein Shapiro Morin & Oshinsky LLP

(57) ABSTRACT

The present invention detects polygons located in a region of diffused light or specular light, divides that polygon and generates subdivided polygons, and for those polygons, carries out lighting processing and rendering processing using linear interpolation according to the conventional Gouraud shading method. In consideration of the efficiency of the image processing, the present invention does not subdivide all the polygons, but rather subdivides the polygons located within the area of diffused light or specular light. Or, the present invention subdivides only those polygons located within areas where the intensity of the diffused light or specular light varies.

11 Claims, 14 Drawing Sheets

DIFFUSED LIGHT AND SPECULAR LIGHT

EMBODIMENT OF PRESENT INVENTION

1. Polygon

1. Polygon

DIFFUSED LIGHT AND SPECULAR LIGHT

LIGHTING MODEL

IMAGE PROCESSING APPARATUS

FLOWCHART FOR IMAGE PROCESSING

Gouraud shading method ized as diffused reflection or specular reflection. The diffused light from diffused reflection is reflected uniformly in all directions by an object. On the other hand, the specular light from specular reflection is the reflection of light with directionality and is reflected with directionality in a direction wherein the angle of reflection is equal to the angle of incidence. Diffused light, such as the midday sun, includes diffused light due to direct illumination from the sun and ambient light or environmental light from light reflected off surrounding objects. Because environmental light consists of innumerable light sources, environmental light is generally processed as a constant term for diffused light in image processing using computers.

IMAGE PROCESSING APPARATUS AND IMAGE PROCESSING METHOD

BACKGROUND OF THE INVENTION

1. Field of the Invention

The present invention relates to an image processing apparatus, and more particularly to an image processing apparatus and method which can more realistically display reflected light such as diffused light and specular light in relation to a light source; the present invention also relates to a recording medium for storing a program which has a computer execute an image processing procedure.

2. Description of the Related Art

Computer simulations and computer games require image processing, for generating image data for a display screen according to the input data provided, to generate more realistic images in real time. Before now, image processing comprised the following: finding coordinates for flat, multi-sided figures or polygons within a three-dimensional space according to the input data and the like; carrying out perspective conversion to two dimensional coordinates of the display screen, for polygons located within the display screen; and generating color data for each pixel in the polygon.

In such an instance, the polygon data used comprises vertex data, such as color or brightness data, normal vectors, and the three-dimensional coordinates of the vertexes of the polygon. With the vertex data based on a two-dimensional coordinate plane, a rendering process generates color data by performing interpolation (linear interpolation) according to a linear function based on the vertex data for each pixel in the polygon.

In order for the display of more realistic images, the effects of the light source must be reflected in the image. Light sources include point light sources, such as sunlight, with very high brightness; light sources such as a spotlight or laser light source, having directionality and high brightness in that direction; and light sources such as starlight, with low brightness, but with directionality and which are reflected by a mirror surface or the like. Light from such light sources is reflected by an object. This reflection can be classified as diffused reflection or specular reflection. The diffused light from diffused reflection is reflected uniformly in all directions by an object. On the other hand, the specular light from specular reflection is the reflection of light with directionality and is reflected with directionality in a direction wherein the angle of reflection is equal to the angle of incidence. Diffused light, such as the midday sun, includes diffused light due to direct illumination from the sun and ambient light or environmental light from light reflected off surrounding objects. Because environmental light consists of innumerable light sources, environmental light is generally processed as a constant term for diffused light in image processing using computers.

The aforementioned diffused light and specular light are characterized by high brightness within a specified area of illumination and decreasing brightness at the periphery of that area. For example, in a field illuminated by a spotlight, only a limited area is an area with high brightness. Specular light from a light source reflected by a mirror surface likewise has high brightness in a limited area.

The color data of the vertex data composing the aforementioned polygon data must be generated with consideration given to the object's color, as well as brightness due to the aforementioned reflected light, and the color of the light itself.

However, the rendering process in image processing using polygons generally uses the Gouraud shading method, using linear interpolation of vertex data. For this reason, effective lighting processing is not possible, depending on the positional relationship of that area and the polygon, in the case of high brightness in a uniform area such as with the diffused light and specular light.

FIG. 12 is a drawing to explain the problems with the Gouraud shading method. In this figure, a spotlight 10 directly illuminates one portion of a triangular polygon 1, comprising vertexes A, B, and C. Consequently, diffused light is generated in this area 10. For this reason, lighting processing reflecting the color of the spotlight and the high brightness must be carried out for this area 10. However, none of the vertexes of the polygon 1 is located within the area 10 and as a result, nothing is reflected in the vertex brightness and color data. The diffused light of the area 10 is therefore not reflected in the polygon 1.

FIG. 13 is a drawing to explain further problems with the Gouraud shading method. In this figure, only one portion, including the vertex C of a triangular polygon 1 comprising vertexes A, B, and C, is illuminated. In this case, lighting processing using diffused light is carried out for the vertex C, but not for vertexes A and B. When the rendering process using the Gouraud shading method with linear interpolation is carried out, the results are then as shown in the lower portion of FIG. 13. The area 12 in the right half of the polygon 1 has high brightness and reflects the color of the light source, but gradually toward the left side (in a linear manner), brightness becomes low and the color of the light source is not reflected. Brightness becomes low in the area 14 in the left half.

Such a display can not correctly show the illumination of only a portion at the left side of the polygon 1 as shown in the upper portion of FIG. 13.

FIG. 14 is a drawing to explain further problems with the Gouraud shading method. In this figure, a spotlight, or the like, illuminates an object comprising a plurality of polygons. The edge of the illuminated area 10 forms a smooth circle. With the Gouraud shading method as shown in FIG. 13, only the linear changes, according to linear interpolation, can be displayed for the portions of the polygons with vertexes located within the area 10. Consequently, the edge becomes uneven as shown with the dotted line 12 in the figure. Also, as shown in FIG. 12, the lighting processing is not carried out for a polygon when the area 10 overlaps a portion of polygon but none of its vertexes is located within the area 10. In such case, also the edge of the area 10 becomes uneven in FIG. 14.

Furthermore, the luminous intensity within the area 10 is, generally speaking, great at the center and small at the edges. It is difficult to reproduce this distribution of luminous intensity in a realistic manner using linear interpolation in the Gouraud shading method.

Meanwhile, another image processing method, the Phong shading method, has been proposed. In this method, the normal vector is found for each pixel and lighting processing with the normal vector and light source vector is performed for each pixel. However, the Phong shading method requires an enormous number of calculations and is therefore not realistic for game apparatuses and simulators which require real time processing.

SUMMARY OF THE INVENTION

In view of the aforementioned issues, it is an object of the present invention to provide an image processing apparatus and method, able to perform more realistic lighting processing, and a recording medium for storing a program which has a computer execute the procedure.

It is another object of the present invention to provide an image processing apparatus and method, which can perform more realistic lighting processing and minimize increases in calculations while resolving the problems with Gouraud shading, and a recording medium for storing a program which has a computer execute the procedure.

In order to achieve the aforementioned objects, the present invention detects polygons located in a region of diffused light or specular light, divides that polygon and generates subdivided polygons, and for those polygons, carries out lighting processing and rendering processing using linear interpolation according to the conventional Gouraud shading method. In consideration of the efficiency of the image processing, the present invention does not subdivide all the polygons, but rather subdivides the polygons located within the area of diffused light or specular light. Or, the present invention subdivides only those polygons located within areas where the intensity of the diffused light or specular light varies.

With the aforementioned invention, only the parts of the polygons located within areas of diffused light or specular light are subdivided and other polygons are processed at their original size as before. Consequently, linear interpolation with the conventional Gouraud shading method is carried out for the subdivided polygons in areas where changes in brightness and color are to be effectively displayed with lighting processing. More realistic lighting processing can thereby be used to generate images without a corresponding increase in processing.

To attain the aforementioned objects, the present invention is an image processing apparatus, for generating image data from data for a plurality of polygons, comprising: vertex data generating portion for generating polygon data comprising vertex data which includes vertex coordinates, color or brightness data, and light source data comprising data of illuminated area by a light source; dividing those of the aforementioned plurality of polygons which are located within the illuminated area to generate new vertex data; and carrying out processing of reflected light in relation to the light source, for the color or brightness data of the vertexes located within the illuminated area; and a rendering processing portion for generating color data for the pixels within the aforementioned polygons using the aforementioned vertex coordinate, color or brightness data generated above.

DESCRIPTION OF THE PREFERRED EMBODIMENTS

Below, the preferred embodiment of the present invention is explained with reference to the figures. However, these embodiments do not limit the technical scope of the present invention.

Figure 1A:
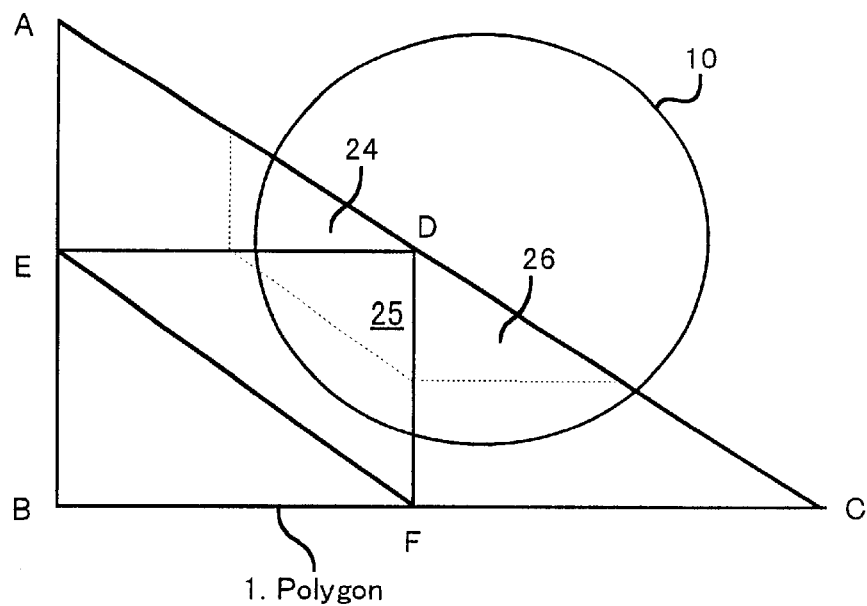
FIG. 1 is a drawing to explain an embodiment of the present invention.
Figure 12:
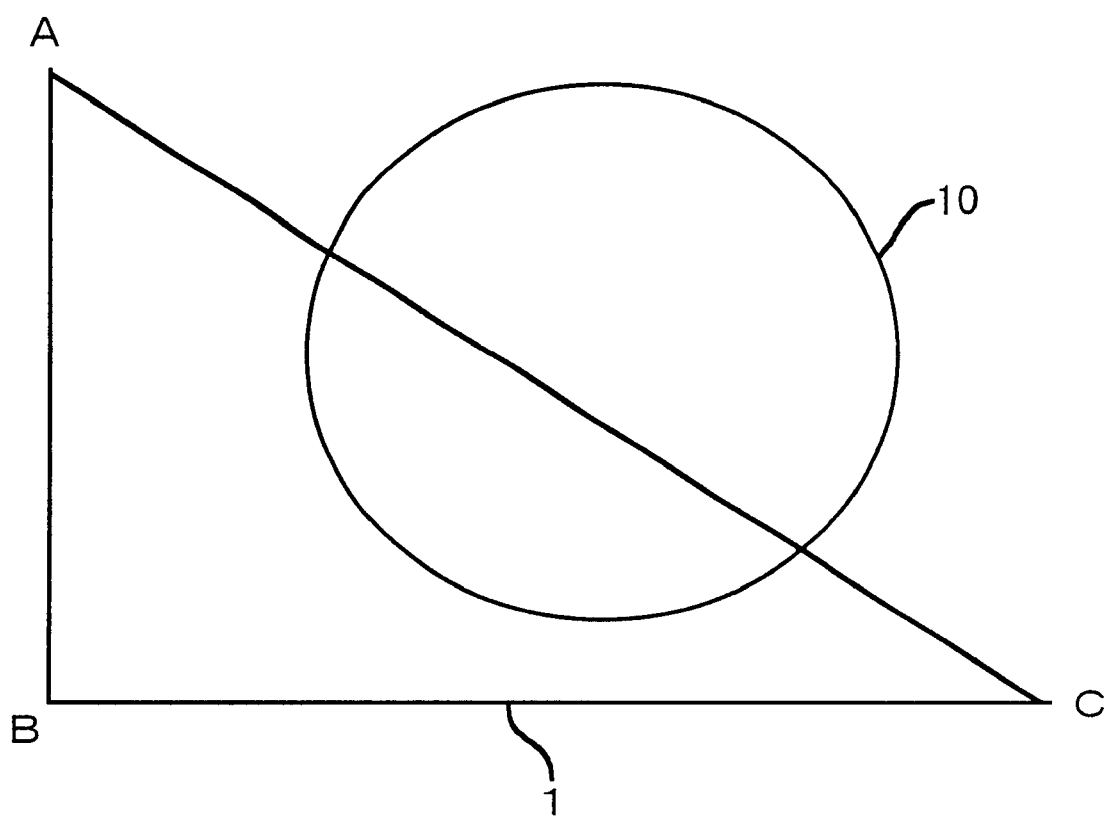
FIG. 12 is a diagram to explain problems with Gouraud shading.

FIG. 1 is a drawing to explain an embodiment of the present invention. FIG. 1A corresponds to the situation explained using FIG. 12 of the background art. In this case, an area 10 of diffused light and specular light is positioned over part of a polygon 1 comprising vertexes A, B, and C. In order for the area 10 to be reflected in the polygon 1, although the vertexes of the polygon 1 are not located within the area 10, new vertexes D, E, and F are generated and the polygon 1 comprising vertexes A, B, and C is divided into four parts. As a result, the vertex D becomes located within the area 10 and lighting processing is carried out for the vertex D. As a result, area 24 of a polygon with vertexes A, E, and D, area 25 of a polygon with vertexes D, E, and F, and area 26 of a polygon with vertexes D, F, and C come to have high brightness and are influenced by the color of the light source.

Figure 1B:
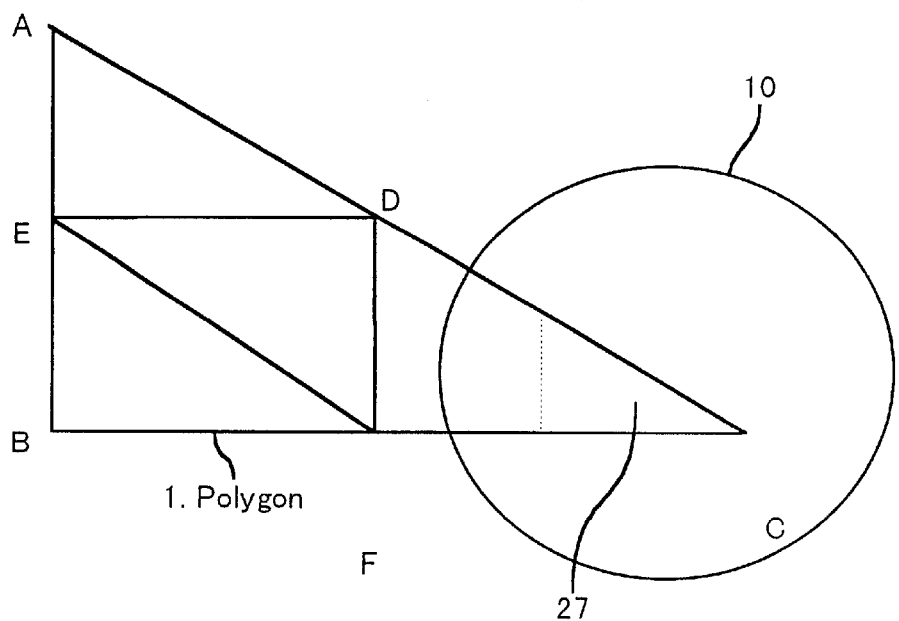
Figure 13:
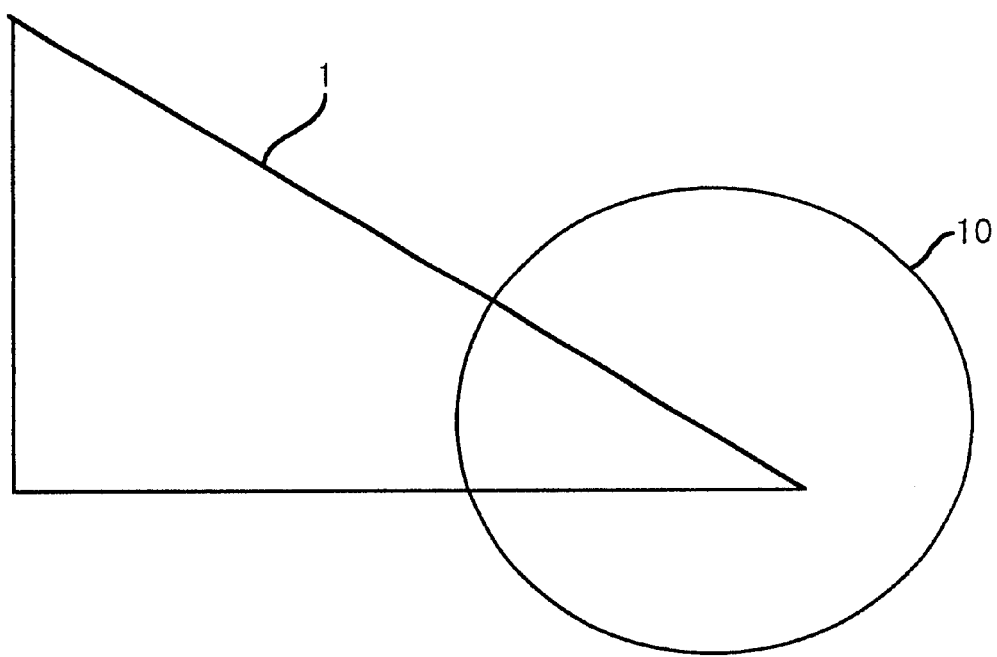
FIG. 13 is a diagram to explain problems with Gouraud shading.
Figure 13:
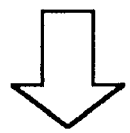
Figure 13:
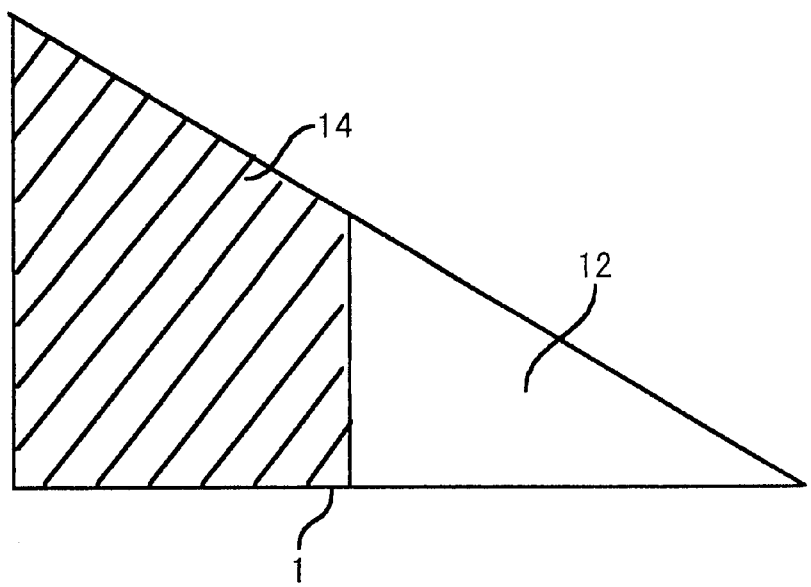

FIG. 1B corresponds to the situation explained using FIG. 13 of the background art. In FIG. 13, the vertex C, at least, is located within the area 10, but it is not possible to correctly represent the edges of the area 10 by applying linear interpolation, according to a pure Gouraud shading method, to the polygon 1. In the embodiment of the present invention, as in FIG. 1B, the polygon is subdivided and new vertexes D, E, and F are generated, even when some of the original vertexes are within the area 10. Then vertex data are generated for those vertexes and rendering processing of Gouraud shading method is carried out. As a result, the right half of the area 27 of the polygon with vertexes D, E, and F is provided high brightness and is influenced by the color of the light source.

Furthermore, the present invention is not limited to the aforementioned example and can distinguish polygons subject to division corresponding to an established lighting model. A polygon subject to division is subdivided by the generation of new vertexes. For example, a polygon, part of which is located within an area where the luminous intensity of the lighting model varies (gradient of luminous intensity), is subject to division. Or, in the case where a lighting model includes an area has a constant luminous intensity and other areas have a luminous intensity of zero, only the portions of a polygon within that area where intensity is constant are subject to division. Polygons located entirely within or outside of the area are not subject to division.

In image processing using computers, the lighting model is determined as an arbitrary and artificial standard by the designer. Consequently, it is impossible to explain how polygons are to be selected for subdivision according to a lighting model. However, if polygons sorted according to a uniform standard are subject to division, it is possible to generate a more realistic, lighting processed image than is the conventional case of applying the Gouraud shading method uniformly to all the original polygons.

Figure 2:
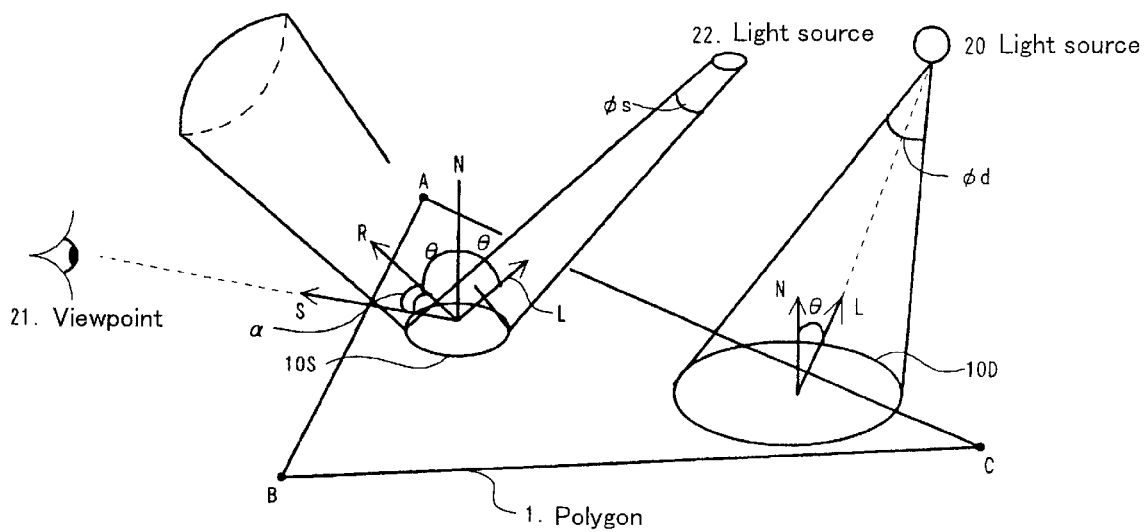
FIG. 2 is a drawing for explaining diffused light and specular light.

FIG. 2 is a figure for explaining diffused light and specular light. FIG. 2 shows a light source 20 and a polygon 1, an area 10D of diffused light from the light source 20, and an area 10S of specular light from a light source 22. When the light source 20 is directional in a single direction, diffused light is generated in an area 10D directly illuminated by light from this source. The intensity of this diffused light can be expressed as the inner product, $\cos \theta$, of the light vector L and normal vector N. For example, the intensity I of the diffused light can be expressed as follows with intensity $I_l$ of incident light from the light source 20, the diffuse reflection coefficient $K_d$, and angle $\theta$ of the light vector L and normal vector N:

$$I = I_a K_a + I_l K_d \cos \theta$$

$I_a$ is the environmental luminous intensity and $K_a$ is the reflection coefficient of environmental light.

Meanwhile, FIG. 2 shows a light source 22 and an area 10S of specular light where the light source 22 is mirror-reflected by the polygon 1. This specular light $I_s$ can be expressed as follows with intensity $I_l$ of incident light from the light source 22, the reflection coefficient $K_s$, and angle $\alpha$ of the reflection vector R and sight vector S:

$$I_s = I_l K_s \cos^n \alpha$$

In either of these cases, for a lighting model with light spreading in uniform conic angles $\phi_d$, $\phi_s$ from the light source, the influence of the reflected light of both must be provided to a polygon located within the areas illuminated by those conic angles $\phi_d$ and $\phi_s$. As understood from the foregoing explanation, the effects of the light source must be applied to polygons located within areas illuminated by light from the light source.

Figure 3:
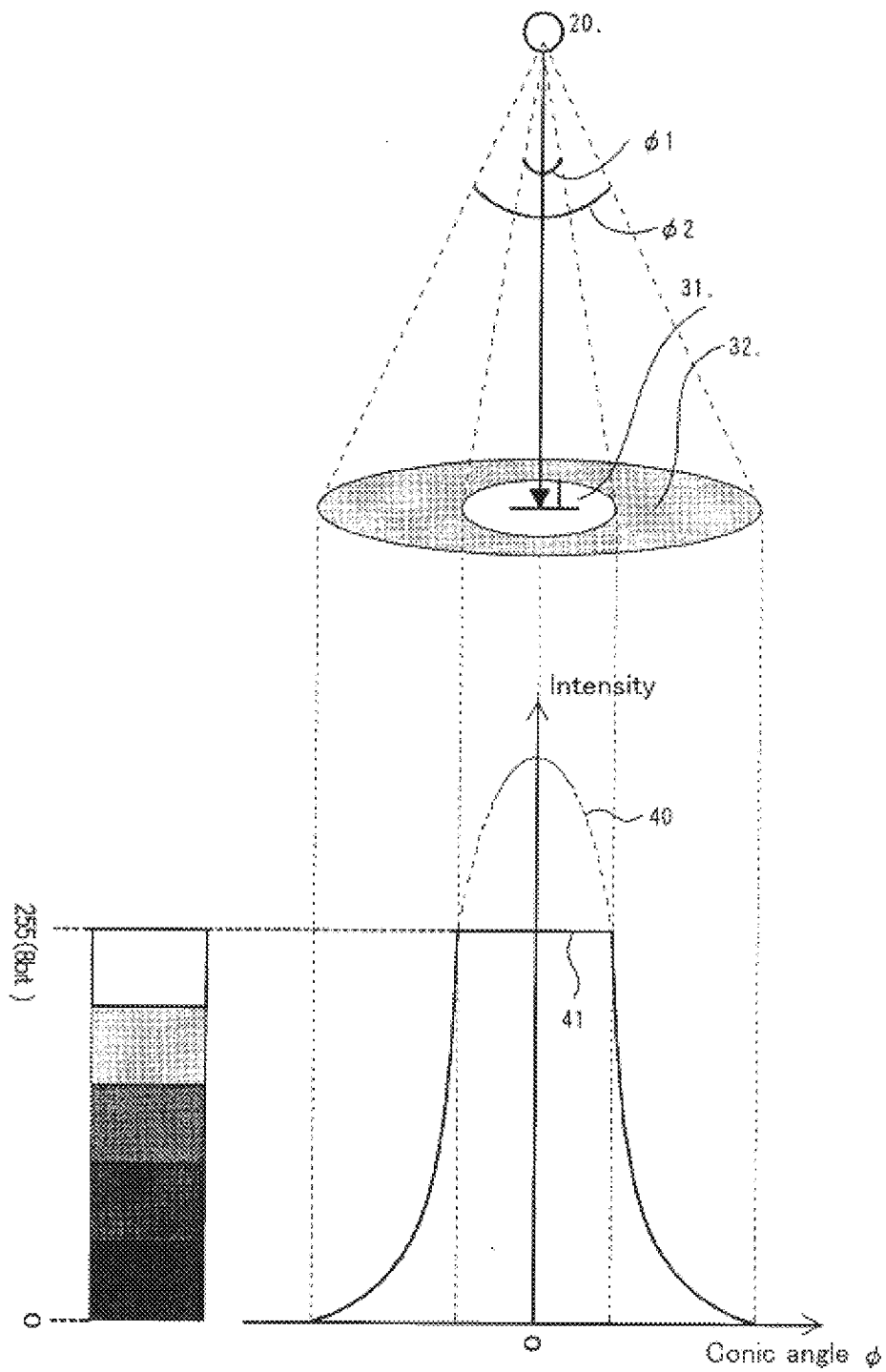
FIG. 3 is a drawing showing a lighting model.

FIG. 3 is a drawing showing a lighting model. This lighting model is an example wherein the luminous intensity from the light source 29 has a normal distribution depending on the conic angle $\phi$. Generally, the central portion 31 of the conic angle of the light source is the area where the luminous intensity is strong and the peripheral portion 32 is an area where the luminous intensity is weak.

In image processing using computers, the lighting model sometimes uses an intensity distribution wherein the luminous intensity of the central portion of the luminous intensity distribution is clamped and the luminous intensity outside of the peripheral portion of the light distribution is cut. In other words, this is the luminous intensity distribution 41 shown with the solid lines in the figure. A distribution of 256 gradations, for example, is allocated to each luminous intensity; thereby making it possible for the human eye to distinguish finer differences in luminous intensity with the use of few gradations.

As discussed above, the lighting model is determined by a designer's arbitrary standard; there are no limits to the type used. However, the lighting model can generally be expressed with the conic angle $\phi$ and the distribution of luminous intensity, as shown in FIG. 3. In the present embodiment, polygons affected by diffused reflected light and mirror-reflected light (specular light) are distinguished according to this distribution.

Figure 4:
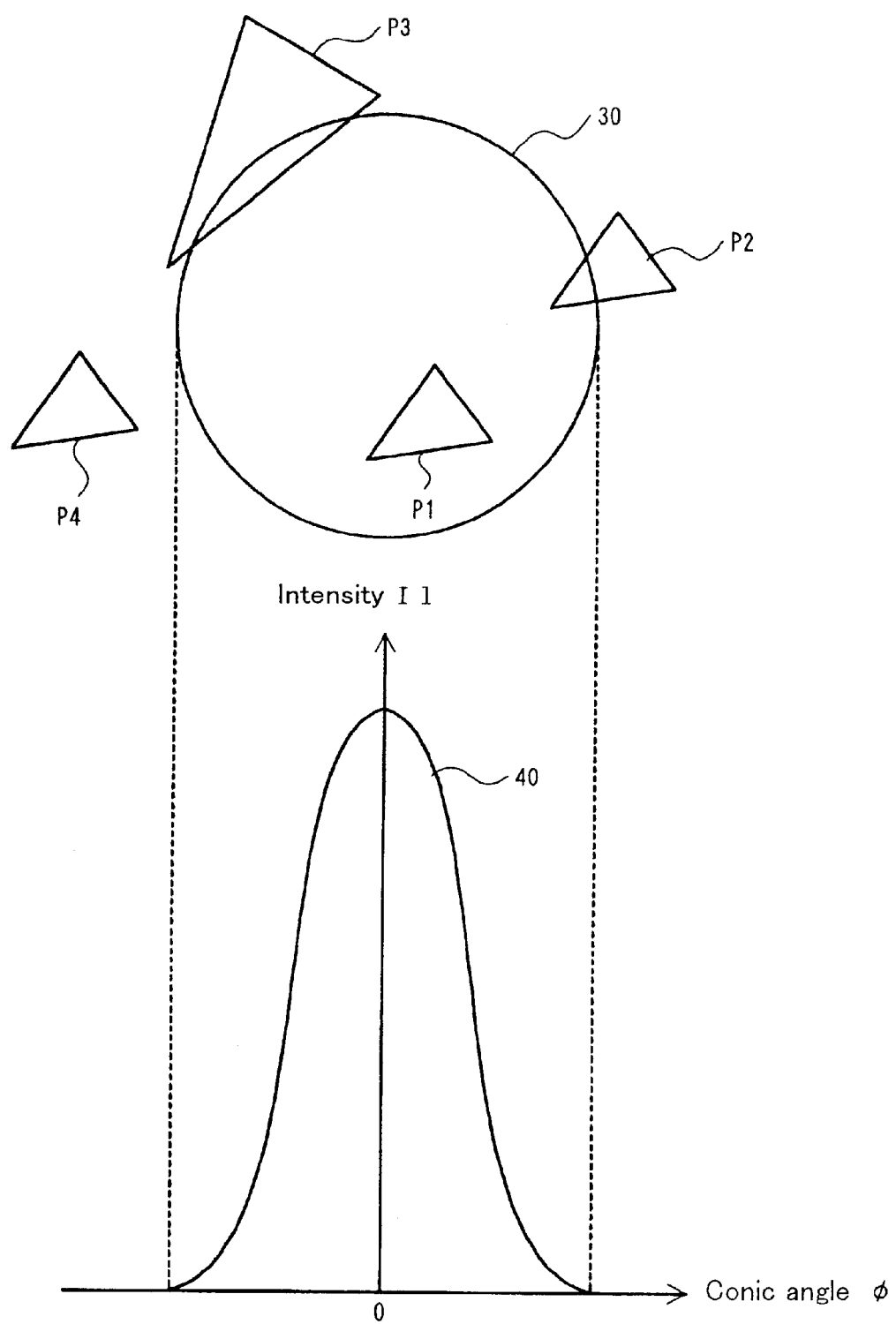
FIG. 4 is a figure for explaining the method for distinguishing polygons subject to division in the case of a lighting model wherein the luminous intensity distribution has a normal distribution form.

FIG. 4 is a figure for explaining the method to distinguish polygons subject to division in the case of a lighting model where the luminous intensity distribution is in the form of normal distribution. In this example, an area 30 where the luminous intensity $I_l$ is not zero is defined. When even part of a polygon is located within this area 30, that polygon is divided and new vectors generated. For example, in FIG. 4, at least a portion of each of the polygons P1, P2, and P3 is located within the area 30. These polygons must therefore reflect the effects of the light source and so are identified as being subject to division. Also, the polygon P4 which is located entirely outside of the area 40 is not subject to division. The aforementioned polygons P1, P2, and P3 are identified as being subject to division since the change of luminous intensity thereof is not uniform.

The normal vectors, brightness data, color data, and so forth, of the new vertexes are found, as discussed below, for the newly generated vertexes of the polygons identified as subjects of division. Using the normal vectors, lighting processing is carried out for the texture data, brightness data, and color data. Linear interpolation according to the Gouraud shading method, is carried out on the basis of the data for the new vectors in the rendering process which follows.

Figure 5:
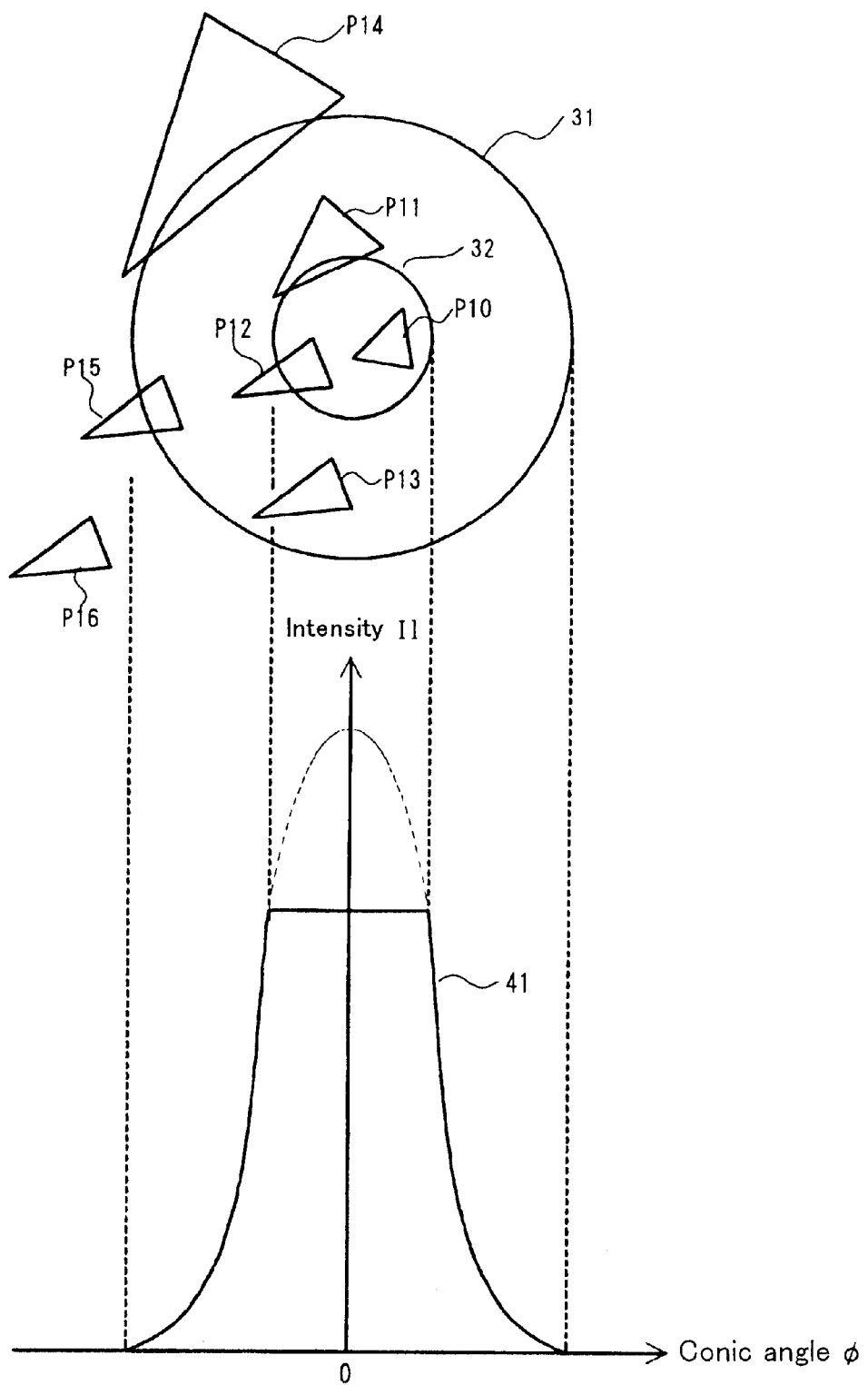
FIG. 5 is a figure for explaining the method for distinguishing polygons subject to division in the case of a lighting model wherein the luminous intensity distribution is in the form of a clamped and cut normal distribution.

FIG. 5 is a figure for explaining the method to identify polygons subject to division in the case of a lighting model where the luminous intensity distribution is a clamped and cut normal distribution. As explained with the lighting model in FIG. 3, this method has been used as a method for allocating the luminous intensity distribution most effectively for a finite number of brightness gradations. Specifically, the clamped area where the luminous intensity is very high cannot be distinguished by the human eye; therefore, the luminous intensity distribution 41 is preferably clamped to a uniform brightness. Also, areas where the normal distribution approaches zero are large areas which cannot be distinguished by the human eye; therefore, the distribution 41 is preferably cut off below a certain value. As a result, the luminous intensity distribution 41 in the lighting model in FIG. 5 becomes as shown with the solid lines in the figure.

In this case, the clamped area 32 and the area 31 where the luminous intensity is not zero are defined. The polygon P10 is located entirely within the clamped area wherein the luminous intensity distribution is uniform; new division is therefore unnecessary. The polygons P11 and P12, located within both area 32 and area 31, are identified as polygons subject to division because the luminous intensity varies non-linearly therein. Furthermore, the polygon P13, located between areas 31 and 32, as well as polygons P14 and P15, parts of which are within area 31, are identified as polygons subject to division because the luminous intensity varies non-linearly therein. The polygon P16, located entirely outside of area 31, is not subject to division.

In the example in FIG. 5, it is not necessary to generate new vertexes and subdivide the polygon P10, all vertexes of which are within areas where luminous intensity does not vary, such as area 32.

In the example in FIG. 5, the gradient of the luminous intensity distribution is constant for the polygon P13, all vertexes of which are located within the donut-shaped area between area 31 and area 32. Consequently, it is acceptable that this polygon not be subdivided, since the results of linear interpolation in the glow shading method will be the same, even if this polygon P13 is subdivided. An algorithm for identifying polygons to be divided can be determined in accord with the display results and the display objective.

Figure 6:
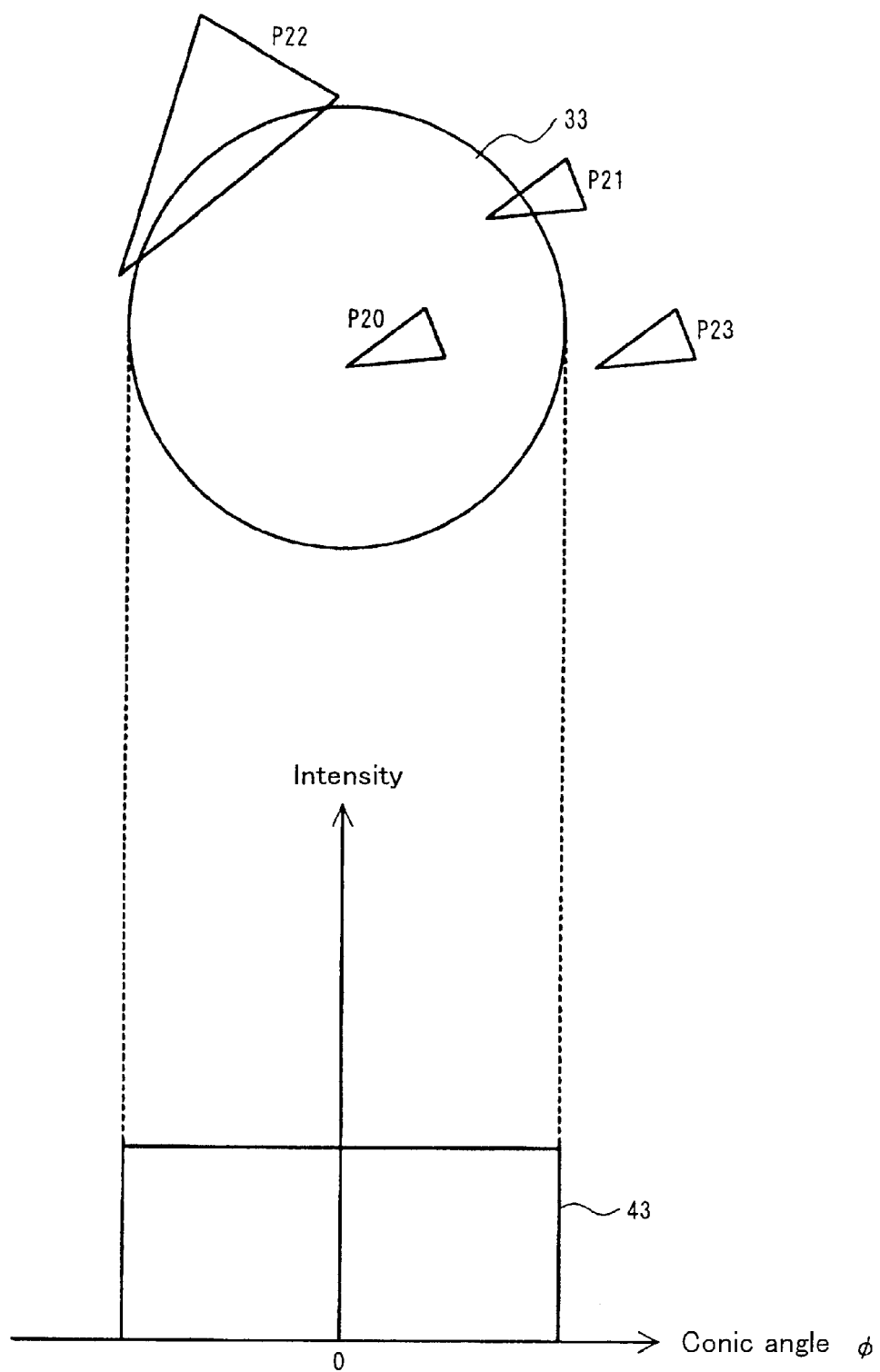
FIG. 6 is a figure for explaining the method for distinguishing polygons subject to division in the case of a lighting model wherein the luminous intensity distribution has purely rectangular form.

FIG. 6 is a drawing to explain the method for identifying polygons subject to division in the case of a lighting model wherein the luminous intensity distribution is a simple rectangle. The model in FIG. 6 concerns a light source having uniform luminous intensity. Specifically, this is a model wherein the entire area within the conic angle from the light source has uniform luminous intensity. The area 33 is defined for the luminous intensity distribution 43.

With the lighting model in FIG. 6, the polygon P20, all vertexes of which are located within the area 33, is not subject to division because the luminous intensity therein is constant. Also, polygons such as P21 and P22, parts of which are located within area 33, are subject to subdivision. These polygons P21 and P22 include areas illuminated by light and areas not illuminated by light. The sharp edge form of the area 33 cannot be represented with a rendering process using simply linear interpolation. Consequently, subdividing these polygons makes it possible to display the edge form more sharply. Moreover, the polygon P23 located outside the area 33 is of course not subject to subdivision.

Figure 7:
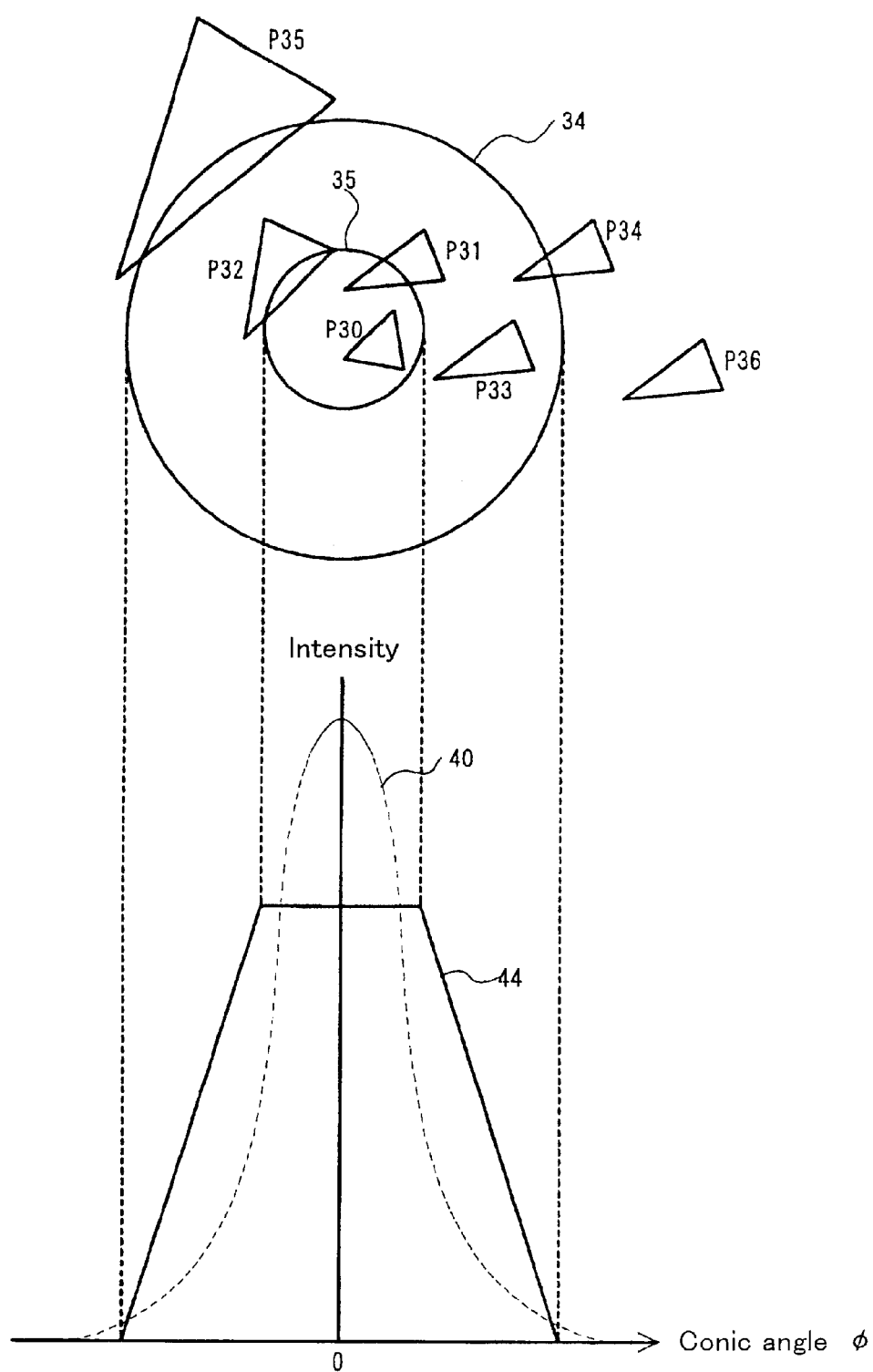
FIG. 7 is a figure for explaining the method for distinguishing polygons subject to division in the case of a lighting model wherein the luminous intensity distribution has a purely trapezoidal form.

FIG. 7 is a drawing to explain the method for identifying polygons subject to division in the case of a lighting model wherein the luminous intensity distribution is a simple trapezoid. The model in FIG. 7 concerns a lighting model with a luminous intensity distribution 44, wherein the normal distribution form 40 in FIGS. 2 and 4, for example, is clamped and cut, and the inclined portion is made linear. The areas 34 and 35 are defined for the luminous intensity distribution 44.

As in the aforementioned models, the polygon P30, having all vertexes located within area 35, is not subject to subdivision. The polygons P31 and 32, present in both areas 35 and 34, are subject to subdivision because of the varying changes of luminous intensity therein. As a result, the edge form of the area 35 can be more sharply represented. Furthermore, the polygon 33, all vertexes of which are located in the area between areas 35 and 34, is not subject to subdivision. Because the luminous intensity in this polygon changes linearly, the luminous intensity for the vertex data will also change linearly, even if they are found using linear interpolation. The polygons P34 and P35, parts of which are located in area 34, are subject to subdivision. The polygon 36, outside of area 34, is not subject to subdivision.

As above, the determination of whether a polygon is subject to division varies depending on the light distribution model for the light source. However, in linear interpolation from the vertex data in the Gouraud shading method, the standard for a polygon being subject to division can be whether the effects of the light source are represented with sufficient realism. One standard, as in the example explained above, is a polygon wherein the luminous intensity changes non-linearly. In effect, this is a polygon located in an area having variations in the gradient of luminous intensity (changes in luminous intensity). When the luminous intensity within the polygon is constant, the polygon does not need to be divided, of course; and luminous intensity is constant within the polygon even after linear interpolation. Also, in the case where the luminous intensity in the polygon changes constantly (uniform gradient), the polygon does not need to be divided because the luminous intensity changes linearly and at a constant proportion, even upon linear interpolation.

Furthermore, in areas with large changes to the gradient of luminous intensity, it is preferable to increase the extent of subdivision in order to more realistically represent the effects of the light source. Meanwhile, in areas where changes to the gradient of luminous intensity are small, the effects of the light source can be represented with sufficient realism with even a small degree of subdivision. In the example in FIG. 5, the polygons P11 and P12 may be more finely divided and the polygon P13 only roughly divided.

Figure 8:
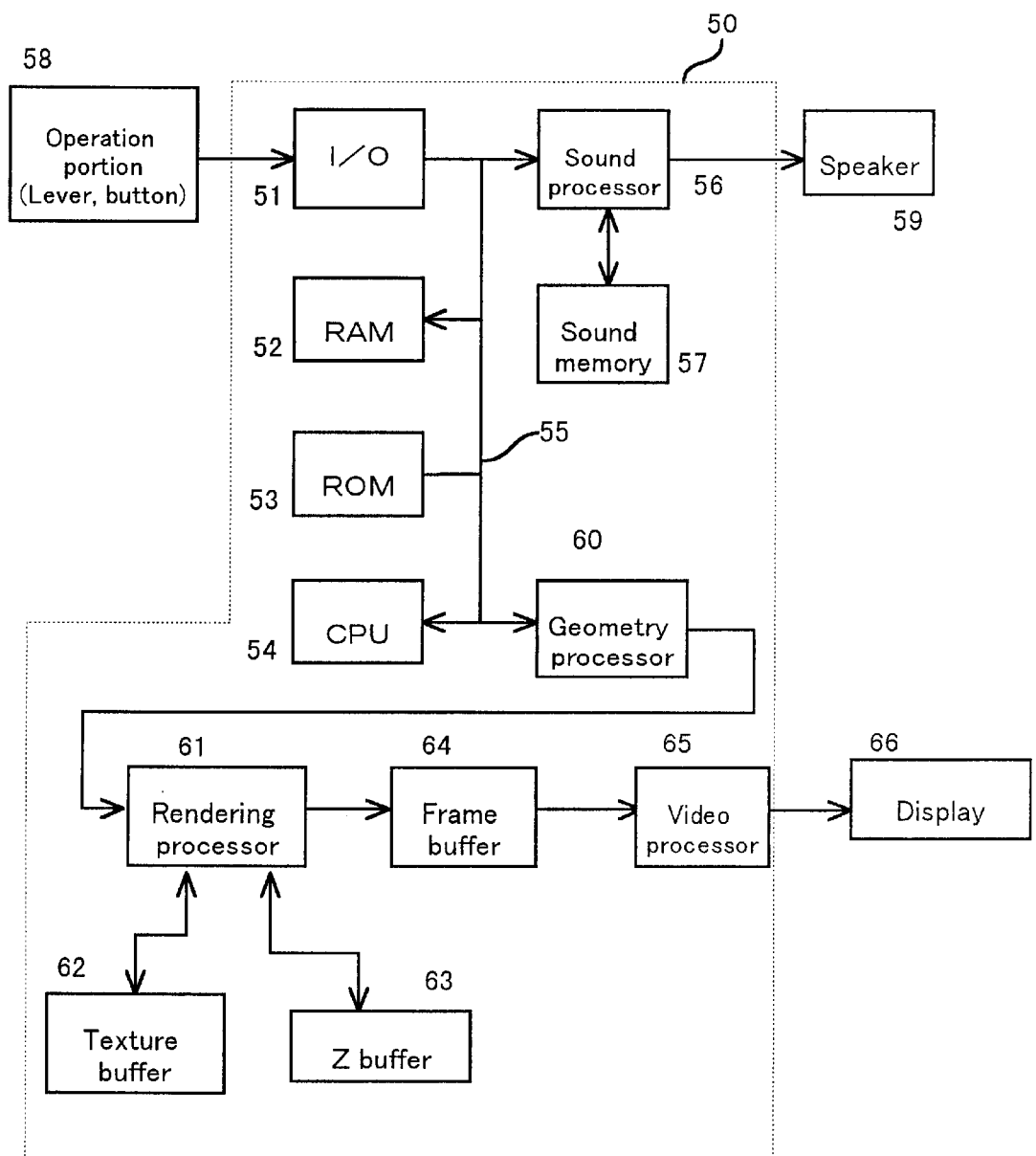
FIG. 8 is a block diagram of the image processing apparatus of an embodiment.

FIG. 8 is a block diagram of the image processing apparatus of the present embodiment. An operation portion 58 for an operator to carry out input operations, a speaker 59 for outputting sounds, and a display apparatus 66 are connected to the image processing apparatus 50 of the present embodiment.

In the image processing apparatus 50, the following are connected with a shared bus 55: an I/O processing portion 51 connected to the operation portion 58, ROM 53 wherein programs or the like for games or simulations are stored, RAM 52 used in calculation processes, CPU 54 for executing the aforementioned programs, and sound processing portion 56. The sound processing portion 56 is connected to the sound memory 57, which stores sound sources and the like; the sound processing portion 56 processes sound according to sound data generated by the CPU 54 and outputs the generated sound signals to a speaker 59. The aforementioned program may also be stored in RAM 52 from outside the apparatus.

The CPU 54 is related to the polygon vertex data generating portion. In respond to the input signals from the operating portion 58, the CPU executes the program within the ROM 53, and generates polygon data composing an object. The polygon data usually comprises vertex data such as texture coordinates, transparency, color data, brightness data, normal vectors, and three-dimensional vertex coordinates composing the polygon. Furthermore, the CPU 54 executes the aforementioned program and generates light source data.

Moreover, the aforementioned color data comprises data for the intensity of the three primary colors red (R), green (G), and blue (B), for example, and includes information on both color and brightness. Meanwhile, the texture data is data relating to the pattern of the polygon and is said to be color data having a standard brightness. Consequently, the aforementioned color data is generated from the brightness data and texture data. As vertex data, the color data and texture data comprise that information itself, but these may also be address and coordinate data pointing to data stored in a separate memory buffer.

The CPU 54 also executes programs in ROM 53 and carries out light source calculations, including color calculations for the vertex data with respect to the light source. With the present embodiment, it is determined at the light source calculation stage whether the vertexes of each polygon are located within areas illuminated with the lighting model. It is determined whether to subdivide the polygon according to that positional relationship. For polygons which are subject to division, new vertexes and vertex data are generated and then the same type of light source calculations are made. This process is discussed later in detail.

Vertex data for which the aforementioned lighting processing has been performed are supplied to the geometry processing portion 60. The geometry processing portion 60 performs similarity transformation processing, such as rotating, expanding, or contracting a polygon within three-dimensional coordinates, and perspective conversion processing, such as converting a polygon within the two-dimensional coordinates on the display screen according to the perspective.

Polygon data comprising vertex data within these two-dimensional coordinates are supplied to the rendering processing portion 61. The rendering processing portion 61 uses the vertex data and performs texture generation and color calculations for each pixel according to the raster-scanning method; it finds color data for each pixel and writes the color data for each pixel to the frame buffer 64. A texture data buffer 62, wherein texture data is stored, and a Z buffer 61, wherein the Z value showing the depth of each pixel within the two-dimensional coordinates (usually, a 1/Z value for ease of calculation) is stored, are generally connected to the rendering processing portion 61. The texture data is taken from the texture buffer 62 on the basis of the pixel texture coordinates found with linear interpolation from the texture coordinates of the vertex data. Color data are found from the brightness values and this texture data (color data having standard brightness). For backside processing, the Z values of the pixels during processing are compared with the Z values in the Z buffer 63; only the image data of the pixels furthest to the front on the screen are stored in the frame buffer 64. The Z values of those pixels are then written to the Z buffer 63.

Before the rendering process, light source calculations, to add the influence of the light source, are already carried out for color or brightness data of the vertex data. Polygons in areas illuminated by the light source are then subdivided and light source calculations are performed for the newly generated vertex data. Consequently, the rendering processing portion 61 performs rendering for pixels by linear interpolation using just the vertex data supplied; the rendering processing portion 61 is thereby able to generate more realistic images of areas illuminated by light from the light source.

In a conventional image processing apparatus, the processing of the polygons by the aforementioned geometry processing portion 60 and rendering processing portion 61 takes the form of pipeline processing, with the polygon data supplied being processed successively and in order. In the case of processing with a general purpose computer, the geometry processing and rendering processing are carried out according to processing programs for each.

Image data, comprising a single frame of color data stored in the frame buffer 64, are supplied to the video processing portion 65 and output as an image signal to the display 66.

Figure 9:
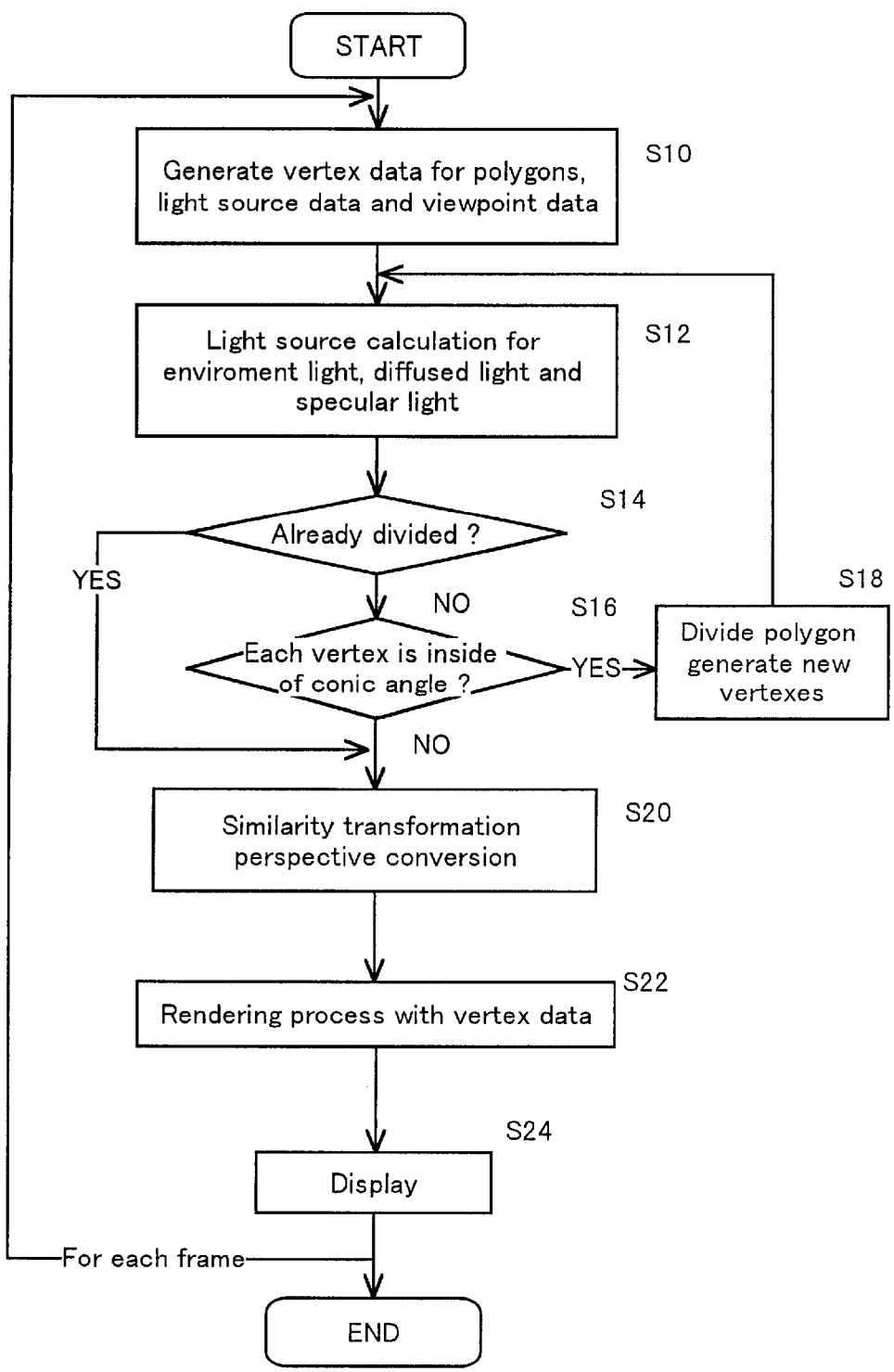
FIG. 9 is a flow chart of the entire process of image processing.

FIG. 9 is a flow chart for the entire image processing procedure using the aforementioned image processing apparatus. As explained using FIG. 8, the vertex data for the polygons are generated in calculations by the CPU 54. The polygon vertex data include three-dimensional coordinate values, normal vectors, color data, brightness data, and texture data, as explained above. The CPU 54 also generates light source data and viewpoint data (S10).

The light source data for a spotlight, for example, includes light source position coordinates, intensity, color, distance traveled by light from the light source, conic angle $\Phi$ as explained using FIG. 2, orientation, and the like. The viewpoint data also includes the location of the viewpoint (three-dimensional coordinates).

In Step S12, the CPU 54 performs light source calculations for each vertex. Environmental light is the intensity of light applied uniformly, as explained above; the aforementioned $I_a K_d$ is found from the light source data. The reflected light from this environmental light is applied to all vertexes.

The processing for diffused light is performed for the vertexes located within the conic angle $\phi_d$ of the lighting model. The luminous intensity at a vertex is found according to the luminous intensity distribution attained from the light source data. The intensity of reflected light due to diffused light ($I_l K_d \cos \theta$) is found from the inner product (cos θ) of the light vector and normal vector.

The processing for specular light is also performed for the vertexes located within the conic angle $\phi_s$ of the lighting model. The luminous intensity at a vertex is found according to the luminous intensity distribution attained from the light source data. The reflection vector is found on the basis of the normal vector at that vertex; the intensity of reflected light due to specular light ($I_s = I_l K_s \cos^n \alpha$) is found from the power of the inner product of the reflection vector and sight vector.

Using each of the aforementioned reflected luminous intensities, the color data of the vertex is corrected by multiplying the light source color data with the original color data of the vertex. The brightness data is also corrected with a similar calculation. Consequently, the color data and brightness data for the vertexes located within an area illuminated by the light source include the effects of the light source.

In the present embodiment, the vertex data for a polygon located within an area illuminated by the light source is used in linear interpolation to generate an image thereof. When it is not possible to reproduce the illuminated area or generate an image with a sufficient sense of place, that polygon is subdivided. To that end, the coordinate data in the vertex data is used to determine whether each vertex is located within the conic angle of the lighting model. On the basis of this determination, the algorithm explained using FIGS. 4–7 is then used to determine whether the polygon subject to division (S16).

When a polygon is found to be subject to division, that polygon is divided and new vertexes generated (S18). The generation of the new vertexes can be carried out by finding, through linear interpolation, vertex data using a method of dividing geometric intervals. The degree of subdivision is as explained using FIGS. 4–7. For example, a polygon located in an area where the gradient of luminous intensity distribution varies greatly is preferably more finely subdivided. A polygon located in an area where the gradient of luminous intensity varies little does not need to be very finely subdivided. The new vertex data undergo lighting processing in a repetition of Step S12. As a result, diffused light and specular light are added when the newly generated vertex is located in an illuminated area. New vertexes are generated when the polygon is divided and require the increase of the aforementioned light source calculations and subsequent rendering processing. The degree of subdivision is therefore determined according to the trade off between the quality of the image produced and processing speed.

In the present embodiment, the process of dividing one polygon is carried out once. Consequently, the polygons generated as a result of this division are not further subdivided. In Step S14, the vertex data after subdivision undergoes similarity transformation and perspective conversion (S20), without undergoing the process (S16) for determining whether division is necessary. As a result, the coordinate data of the vertexes is transformed to two-dimensional coordinate data for the display screen. This process S20 is carried out with the geometry processing portion 60.

As a result of the perspective conversion process, the size of the polygon on the screen where it is actually displayed is confirmed. Consequently, the degree of subdivision of the polygon can be determined at this time. In that case, the vertex data generated in the repeated Step S12 must be processed. When the image processing apparatus has the limits of its capacity, the polygon is divided before the perspective conversion, as explained above.

The vertex data which has undergone perspective conversion is then supplied to the rendering processing portion 61 and undergoes rendering processing, as explained above, using the texture buffer and Z buffer (S22). Image data for each pixel generated thereby is stored in the frame memory 64. The aforementioned Steps S12–S22 are performed for all pixels in a single frame. The image signal is finally sent to the display 66 by the video processing portion 65 and displayed (S24).

Figure 10:
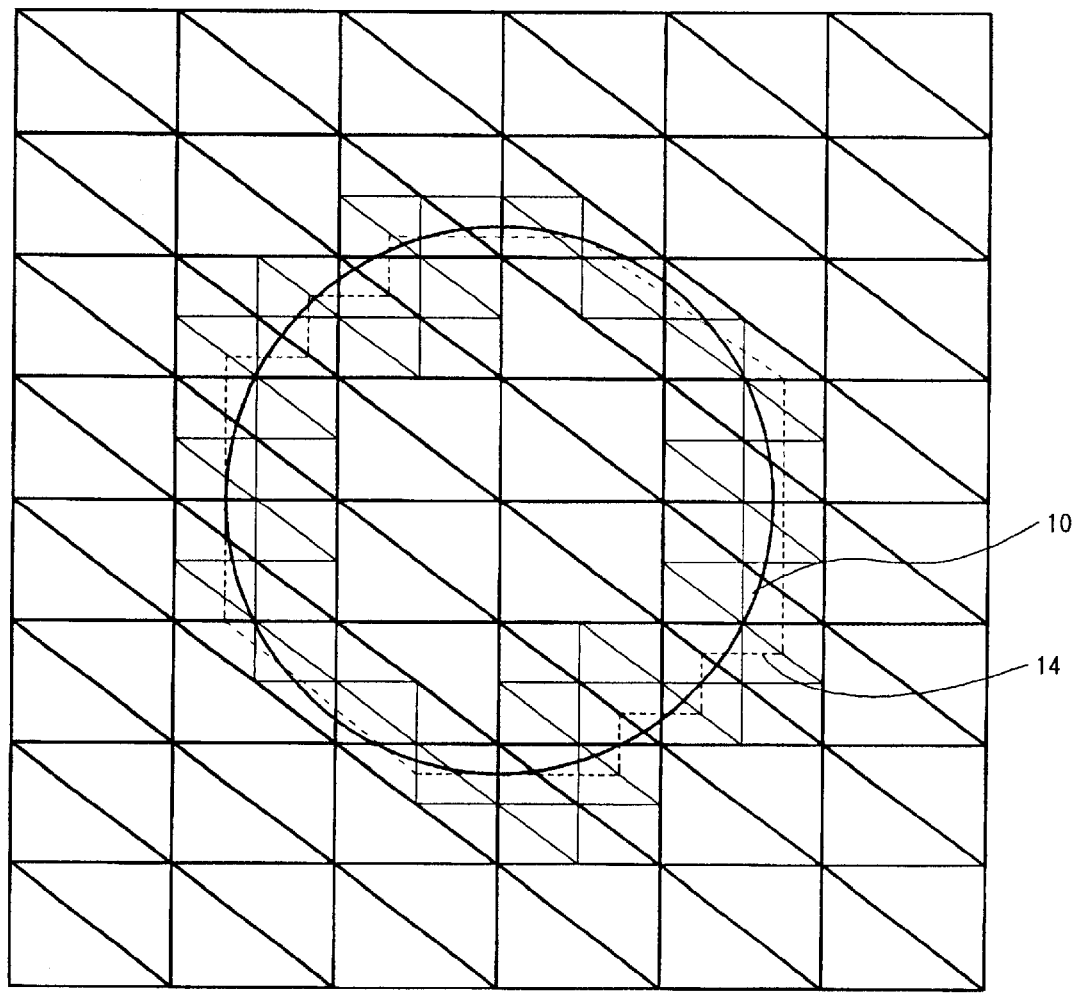
FIG. 10 is a diagram to show the illuminated area processed by Gouraud shading in the event of polygon division in the embodiment.
Figure 14:
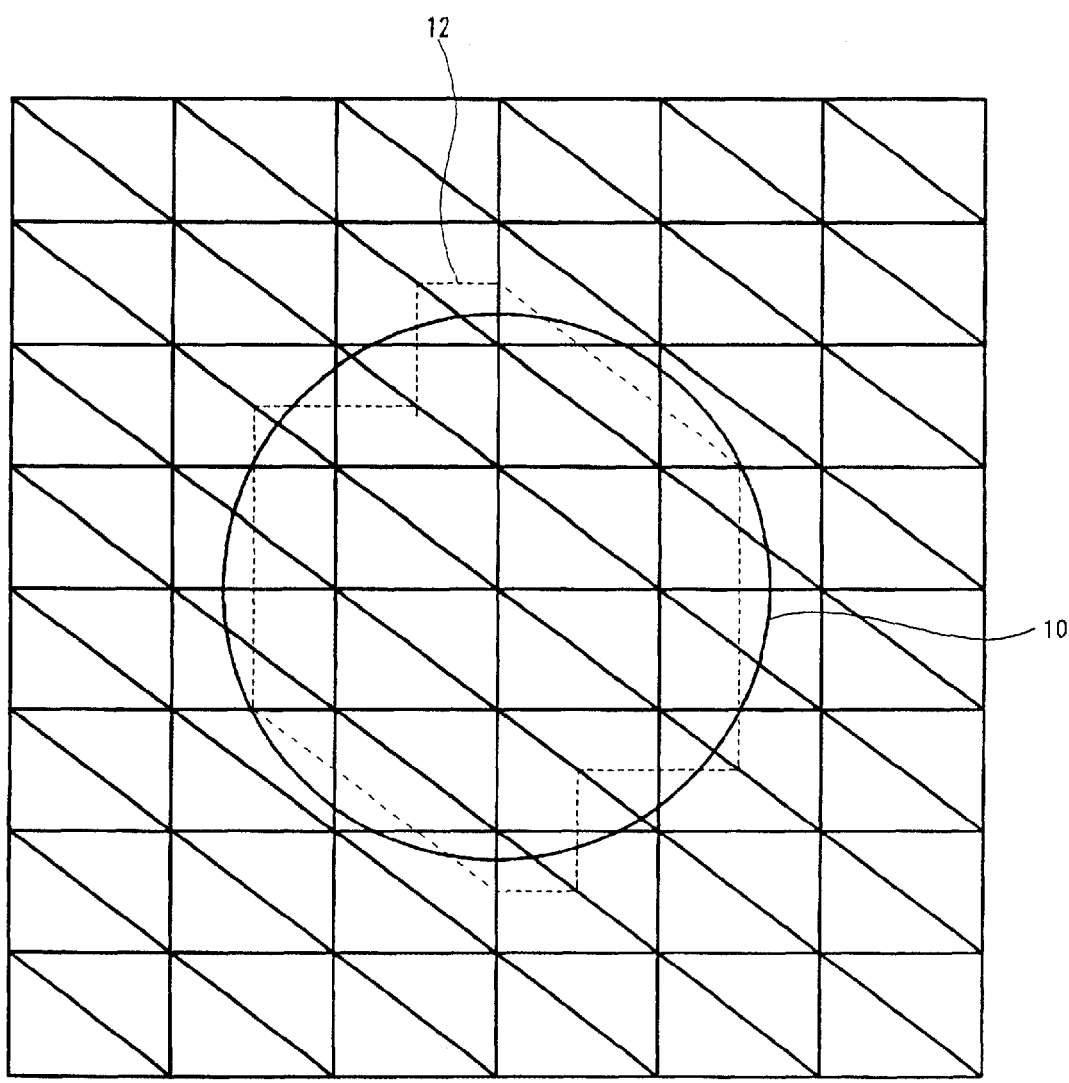
FIG. 14 is a diagram to explain problems with Gouraud shading.

FIG. 10 is a drawing to show an illuminated area processed by Gouraud shading when a polygon is divided as in the present embodiment. This corresponds to FIG. 14 of the background art. In FIG. 14, the dotted line 12 showing the edge of the illuminated area has a form different from the actual circle. In the example in FIG. 10, however, the form is more circular. The example in FIG. 10 shows the application of the present embodiment to the case of the lighting model in FIG. 6. Specifically, only a polygon located across the edge of the illuminated area 10 is subject to division. The polygons along the edge portion are accordingly subdivided. As a result of the subsequent linear interpolation for the Gouraud shading process, the edge of the illuminated area displayed becomes as shown with the dotted line 14. As the degree of subdivision increases, the form can be made more circular.

Figure 11:
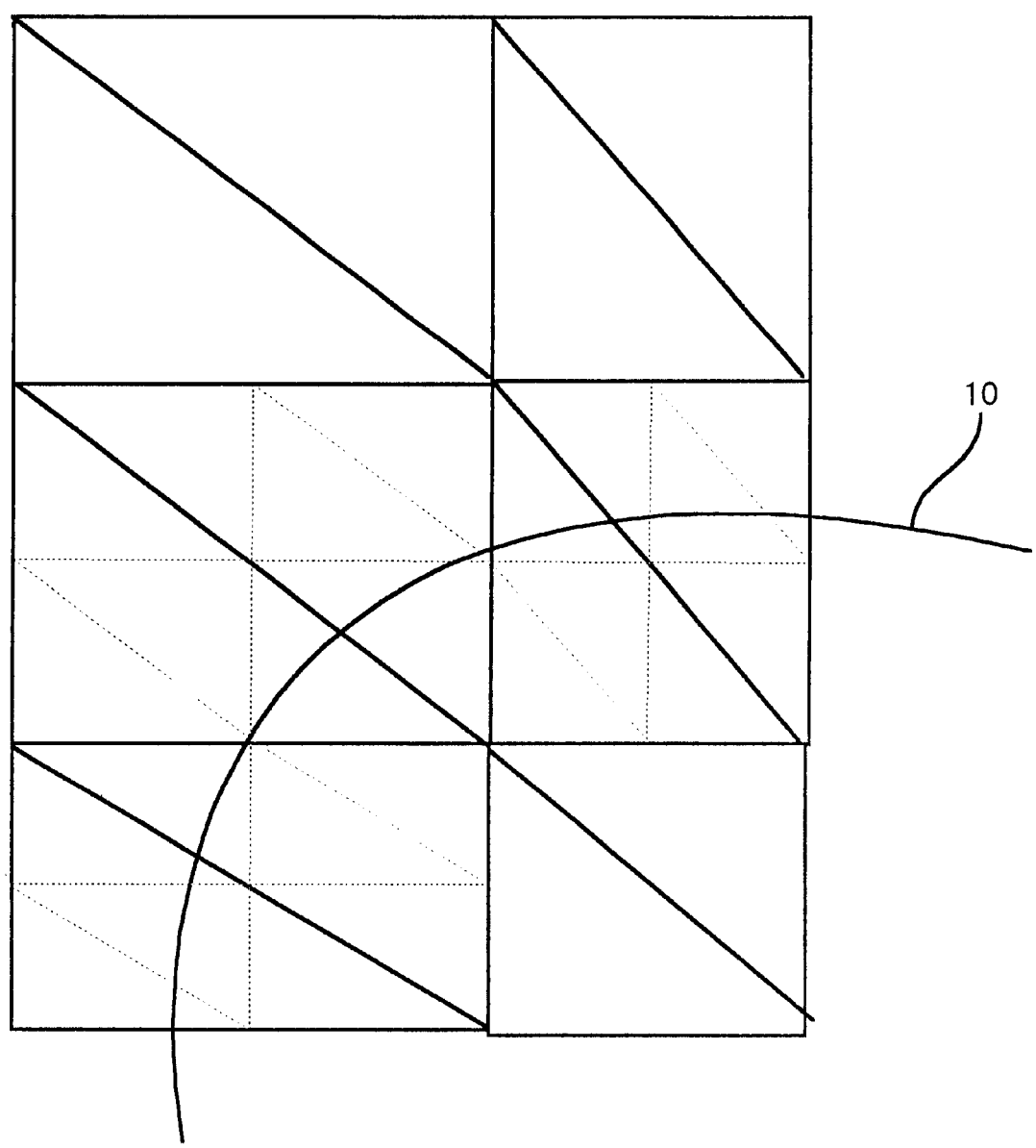
FIG. 11 is a diagram showing an example of the method for dividing polygons.

FIG. 11 is a drawing to show an example of the method for dividing polygons. In this example, from among a set of triangular polygons of varying sizes, those polygons located on the edge of an area 10 illuminated by the light source are divided into four equal parts. As explained above, the number of divisions is determined according to the amount of change in the gradient of luminous intensity distribution of the lighting model. In the example in FIG. 11, the number of divisions is equal regardless of the sizes of the polygons. The reason why the number of divisions is equal in this example is as follows. As explained for perspective conversion processing, it is ideal to determine the number of divisions according to the amount of change in the gradient of the luminous intensity distribution of the aforementioned lighting model with considering the sizes of the polygons which are ultimately displayed. In the present embodiment explained above, however, the pertinent polygons are divided before perspective conversion in order to reduce the processing load. Consequently, in the example in FIG. 11, the processing can be further reduced or simplified by dividing all polygons subject to division into an equal number of divisions.

As explained above, even when performing rendering processing according to the Gouraud shading method, the present invention can generate an image which more realistically shows the effects of light by dividing only those polygons located in areas illuminated by the light source. Moreover, the overall processing load is not greatly increased because a simple process is used to divide only some of the polygons.

Consequently, the present invention can be applied to an image processing apparatus in a game apparatus or the like for which costs must be reduced. An image which underwent more realistic lighting processing can be generated while increased costs are suppressed.

What is claimed is:

1. An image processing apparatus, for generating image data from data from data for a plurality of polygons, comprising:

a vertex data generating portion
  for generating polygon data including vertex data which includes vertex coordinates data and color or brightness data, and light source data which includes data for an illuminated area by a light source, said illuminated area including a boundary;
  for dividing a polygon located at the boundary of the illuminated area into a plurality of divided polygons by generating new vertex data for the plurality of divided polygons; and
  for carrying out processing of reflected light in relation to said light source, for the color or brightness data of said vertexes located within said illuminated area; and a rendering processing portion for generating color data for pixels within said polygon using said vertex coordinates data and said color or brightness data generated above.

2. The image processing apparatus according to claim 1, wherein:
said light source data comprises data for luminous intensity distribution within said illuminated area; and said vertex data generating portion divides the polygons located in areas, within said illuminated areas, where the change in said luminous intensity distribution varies.

3. The image processing apparatus according to claim 2, wherein:
said vertex data generating portion divides a first polygon, located within an area where said change in luminous intensity distribution has a first rate of variability, into a first number of divisions, and divides a second polygon, located within an area where said change in luminous intensity distribution has a second rate of variability greater than said first rate of variability, into a second number of divisions greater than said first number of divisions.

4. The image processing apparatus according to claim 1, wherein:
the image comprising said plurality of polygons is displayed in real time according to color data generated by said rendering processing portion.

5. The image processing apparatus according to claims 1, 2, 3, or 4, wherein:
said vertex data generating portion divides the polygons using equal ratio geometric division.

6. An image processing method, for generating image data from data for a plurality of polygons, comprising:
a vertex data generating process comprising,
  generating polygon data including vertex data which includes vertex coordinates data and color or brightness data, and light source data which includes data for an illuminated area by a light source, said illuminated area including a boundary,
  dividing a polygon located at the boundary of the illuminated area into a plurality of divided polygons by generating new vertex data for the plurality of divided polygons, wherein each of said plurality of divided polygons has at least one vertex located within the illuminated area; and
  carrying out processing of reflected light in relation to said light source, for the color or brightness data of said vertexes located within said illuminated area; and a rendering process for generating color data for the pixels within said polygons using said vertex coordinates data and said color or brightness data generated in said vertex data generating process.

7. The image processing method according to claim 6, wherein:

said light source data comprises data for luminous intensity distribution within said illuminated area; and the polygons located in areas, within said illuminated areas, where the change in said luminous intensity distribution varies, are divided in said vertex data generating process.

8. The image processing apparatus according to claim 7, wherein:

in said vertex data generating process, a first polygon, located within an area where said change in luminous intensity distribution has a first rate of variability, is divided into a first number of divisions, and a second polygon, located within an area where said change in luminous intensity distribution has a second rate of variability greater than said first rate of variability, is divided into a second number of divisions greater than said first number of divisions.

9. A computer-readable recording medium storing a program which causes a computer to execute image processing procedures for generating image data from data for a plurality of polygons, wherein said image processing procedures comprise:

a vertex data generating procedure for generating polygon data including vertex data which includes vertex coordinates data and color or brightness data, and light source data which includes data for illuminated area by a light source, said illuminated area including a boundary;

for dividing a polygon located at the boundary of the illuminated area into a plurality of divided polygons by generating new vertex data for the plurality of divided polygons, wherein each of said plurality of divided polygons has at least one vertex located within the illuminated area; and for processing reflected light in relation to said light source for the color or brightness data of said vertexes located within said illuminated area.

10. The computer-readable recording medium according to claim 9, wherein:

said light source data comprises data for luminous intensity distribution within said illuminated area; and the polygons located in areas, within said illuminated areas, where the change in said luminous intensity distribution varies, are divided in said vertex data generating procedure.

11. The image processing apparatus according to claim 10, wherein:

in said vertex data generating procedure, a first polygon, located within an area where said change in luminous intensity distribution has a first rate of variability, is divided into a first number of divisions, and a second polygon, located within an area where said change in luminous intensity distribution has a second rate of variability greater than said first rate of variability, is divided into a second number of divisions greater than said first number of divisions.

* * * * *